United States Patent [19]

Mizuhara

[11] Patent Number: 4,531,502

[45] Date of Patent: Jul. 30, 1985

[54] THERMALLY INSULATED PISTON

[75] Inventor: Howard Mizuhara, Hillsborough, Calif.

[73] Assignee: GTE Products Corporation, Stamford, Conn.

[21] Appl. No.: 495,849

[22] Filed: May 18, 1983

[51] Int. Cl.³ .......... F01B 31/08; F16J 1/00

[52] U.S. Cl. .......... 123/668; 123/193 P; 92/176

[58] Field of Search .......... 123/193 P, 668, 669; 92/176, 248, 249

[56] References Cited

U.S. PATENT DOCUMENTS

| | | | |
|---|---|---|---|
| 1,719,215 | 7/1929 | Faroy et al. | 92/224 |
| 3,730,163 | 5/1973 | Elsbett et al. | 123/193 P |
| 4,398,527 | 8/1983 | Rynbrandt | 123/193 C |
| 4,446,698 | 5/1984 | Benson | 60/520 |

FOREIGN PATENT DOCUMENTS

| | | | |
|---|---|---|---|
| 2092709 | 8/1982 | United Kingdom | 123/193 P |

*Primary Examiner*—Craig R. Feinberg
*Assistant Examiner*—David A. Okonsky
*Attorney, Agent, or Firm*—Donald R. Castle

[57] ABSTRACT

A thermally insulated piston for an internal combustion engine comprises a cast piston with a top wall having an annular recess, a cast iron annular cap in the recess, and a low thermal conductivity honeycomb structure between the cap and the bottom of the recess. The honeycomb structure has a plurality of cells, each formed of (stainless steel) foil filled with insulating material and brazed to the cap and to the bottom of the recess. This structure is a thermal barrier to the flow of heat from the cap to the main body of the piston, has high strength in compression and facilitates the adibatic expansion of gasses in the cylinder of the engine, particularly a diesel engine.

7 Claims, 1 Drawing Figure

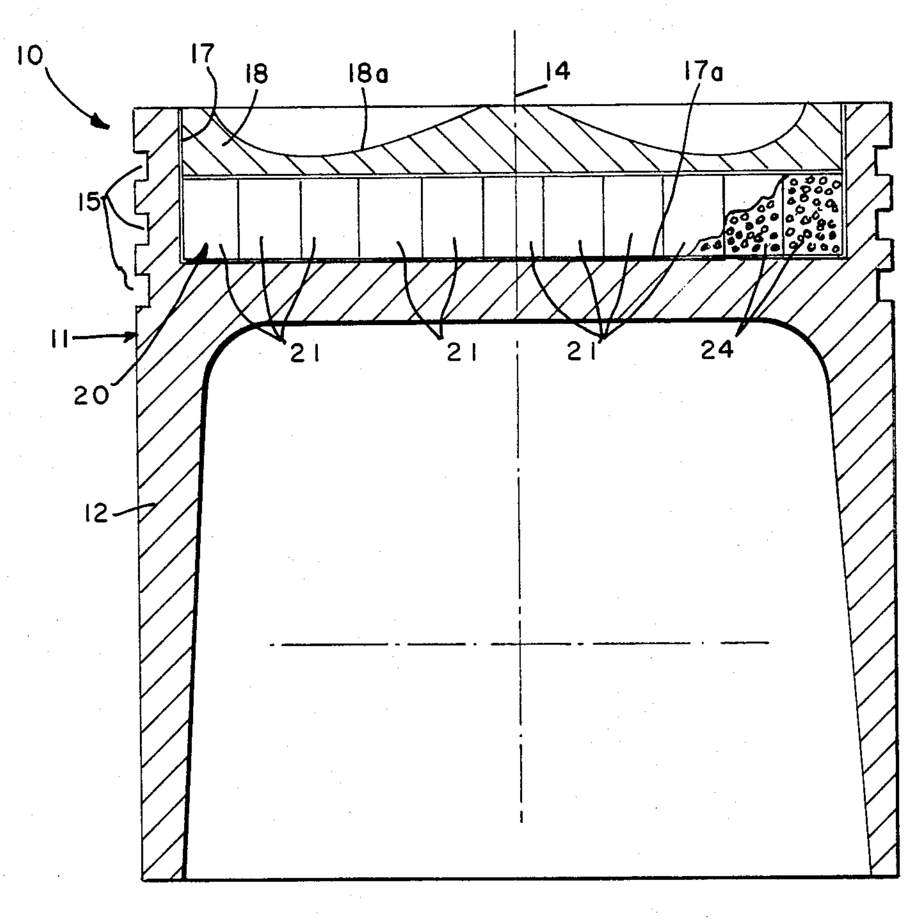
10
17
18
18a
14
17a
15
11
20
21
21
21
24
12

THERMALLY INSULATED PISTON

BACKGROUND OF THE INVENTION

This invention relates to internal combustion engine pistons and more particularly to a thermally insulated piston which restricts flow of heat from the combustion chamber through the piston body.

The efficiency of internal combustion engines, and in particular diesel engines, is improved by retaining heat from the ignited fuel in the combustion chamber of the cylinder by minimizing heat loss through the piston. This has been done in the past by insulating the piston cap by various techniques described below. A major problem, however, has been in the method of holding the ceramic cap in place under operating conditions. To date, no reliable bond between the curved surfaces of the ceramic member and the piston has been devised.

U.S. Pat. No. 4,242,948 describes a piston which uses a metal bolt to attach a ceramic cap to the piston body. The metal bolt, however, expands during operation and tends to loosen the connection of the cap to the piston. Any ceramic chip between the cap and the piston will cause the cap to break when the engine cools to room temperature and the bolt shrinks. Another proposal is to shrink fit a carefully ground ceramic liner into a steel piston cap. This construction is susceptible to failure from ceramic cracks due to the irregular shear force which exceeds the mechanical property of the ceramic material.

In general success in insulating pistons with ceramic material has been limited because of the difficulty of attaching the ceramic piece to the metal piston body without adversely stressing the ceramic piece during operation of the engine.

OBJECTS AND SUMMARY OF THE INVENTION

A general object of the invention is the provision of a thermally insulated piston constructed without the use of ceramic inserts or the like.

A further object is the provision of such a piston that can be produced at reasonable cost.

These and other objects of the invention are achieved with a piston having a separate cast metal cap secured within a recess in the top of the piston by a honeycomb structure having a plurality of tubular cells filled with thermal insulating material, the axes of the cells being parallel to the longitudinal or stroke axis of the piston. The honeycomb is formed with a low thermal conductivity metal foil and is secured by brazing to the cap and the bottom of the piston recess.

BRIEF DESCRIPTION OF THE DRAWING

The sole FIGURE is a cross-sectional view of the piston of the present invention.

DESCRIPTION OF PREFERRED EMBODIMENT

Referring the single drawing, a preferred embodiment of the invention comprises a cast iron piston 10 having a main body 11 with a skirt 12 adapted to be connected to a piston pin, not shown, along an axis and having a longitudinal axis 14. The upper portion of piston 10 has external annular grooves 15 to receive conventional piston rings, not shown, and is formed with a central cylindrical upwardly facing recess 17. A cylindrical cap 18 disposed in the upper portion of recess 17 is secured to and spaced from bottom wall 17*a* of the recess by a honeycomb structure 20 described in detail below. Cap 18 and the main body 11 of the piston 10 preferably are formed from cast iron. The outer surface 18*a* of cap 18 defines part of the combustion chamber of the engine in which the piston is assembled.

Honeycomb structure 20 comprises a plurality of separate contiguous tubular cells 21 having parallel axes which are parallel to the longitudinal axis of the piston. The cells are defined by a metal foil having low thermal conductivity, such as stainless steel. Each of the cells is filled with insulating material 24 which preferably is hollow graphite spheres or silica powder mixed with a water soluble gel such as Ludox made by E. I. Dupont de Nemeurs & Company and which air hardens to cement the particles together. Cap 18 and structure 20 are secured together and to the main 11 body of the piston within recess 17 by brazing material such as copper or Cocuman (in weight percent 58.5 Cu, 31.5 Mn and 10 Co) manufactured by WESGO Division of GTE Products Corporation. Such brazing material may be preforms made by melt spinning or similar process and placed between the parts to be brazed.

A stainless steel honeycomb made from 10 mil foil and with $\frac{1}{4}$ inch diameter circular cells is readily capable of supporting combustion chamber pressures of 2000 psi at temperatures of 1500° F. The entire honeycomb structure is an effective thermal barrier since stainless steel has poor thermal conductivity. Low density amorphous silica or carbon spheres with a conductivity of 0.0004 cal/cm-sec-°C. insures minimum transfer of heat from cap 18 to the main body 11 of the piston.

While the invention has been described in a preferred embodiment in a piston, the thermal barrier also may be used with merit and advantage in a valve face, cylinder head or cylinder wall or similar structures to thermally insulate them. The scope of the invention therefore is defined by the appended claims.

What is claimed is:

1. A piston for use in an internal combustion engine having a combustion chamber and having a longitudinal axis, comprising a main body having a wall defining part of said combustion chamber, said wall having a central recess with a bottom and a cap in said recess and a heat barrier disposed between and secured to said cap and the bottom of said recess, said barrier comprising a honeycomb structure containing thermal insulating material.

2. The piston according to claim 1 in which the composition of said body and said cap is iron.

3. The piston according to claim 1 in which said insulating material comprises hollow graphite spheres.

4. The piston according to claim 1 in which said insulating material comprises silica.

5. The piston according to claim 1 in which said honeycomb structure comprises a plurality of separate contiguous tubular cells having axes parallel to said piston axis.

6. The piston according to claim 5 in which said cells are defined by foil having low thermal conductivity.

7. The piston according to claim 6 in which said foil is composed of stainless steel.

* * * * *